United States Patent [19]

Fitch et al.

[11] Patent Number: 5,338,711
[45] Date of Patent: Aug. 16, 1994

[54] HIGH ALUMINA REFRACTORY SHAPES

[75] Inventors: Lawrence D. Fitch, Bethel Park; Stanley A. Smith, Pittsburgh, both of Pa.

[73] Assignee: Indresco Inc., Dallas, Tex.

[21] Appl. No.: 81,437

[22] Filed: Jun. 21, 1993

[51] Int. Cl.$^5$ .................... C04B 35/10; C04B 35/56
[52] U.S. Cl. ........................ 501/89; 501/128
[58] Field of Search ..................... 501/89, 128

[56] References Cited

U.S. PATENT DOCUMENTS

| | | | |
|---|---|---|---|
| 4,088,502 | 5/1978 | LaBar | 501/124 |
| 4,126,474 | 11/1978 | Talley et al. | 501/125 |
| 4,209,056 | 6/1980 | Gardikes et al. | 164/16 |
| 4,561,958 | 12/1985 | Stewart et al. | 501/128 X |
| 5,039,634 | 8/1991 | Dulberg et al. | 501/95 |
| 5,190,899 | 3/1993 | Sutor | 501/127 |
| 5,214,006 | 5/1993 | Langenohl | 501/89 |

FOREIGN PATENT DOCUMENTS

| | | | |
|---|---|---|---|
| 0023024 | 2/1980 | Japan | 501/89 |
| 0629200 | 9/1978 | U.S.S.R. | 501/89 |

*Primary Examiner*—Karl Group
*Assistant Examiner*—David R. Sample
*Attorney, Agent, or Firm*—John L. Sigalos

[57] ABSTRACT

Mixes for forming high alumina refractory shapes with high resistance to aluminum penetration comprising at least about 60% by weight aluminum oxide, about 1 to 5% by weight boron phosphate, and about .5 to 15% by weight silicon carbide. A phosphorous-containing binder is added and the mix can be formed into brick which when cured or burned to a temperature below the oxidation temperature of silicon carbide can be used to minimize aluminum penetration and dross when the brick are employed in a metallurgical vessel in contact with molten aluminum.

11 Claims, No Drawings

HIGH ALUMINA REFRACTORY SHAPES

BACKGROUND OF THE INVENTION

The present invention relates to high alumina refractory shapes that are used primarily in contact with molten aluminum and which have high resistance to aluminum penetration and buildup of dross.

Refractory shapes, such as brick, are commonly utilized in furnaces and other metallurgical vessels in which molten aluminum is being handled or processed. One of the major problems with such refractory shapes, is a vulnerability to penetration therethrough of the aluminum and reaction therewith as well as dross buildup on the brick. Such penetration and buildup combine to shorten service life for the refractories employed as well as to increase the need for mechanical cleaning of the refractory particularly to remove the dross buildup. Further, because of the buildup a reduced capacity of the metallurgical vessel can result.

Efforts to overcome these problems and to increase the service life of the refractories have not been entirely successful due either to the fact that there is still undesirable aluminum penetration or adhesion to the brick and in some instances the additives used to improve penetration resistance result in undesirable lowering of the hot strength of the shape or brick or adversely affect the processing characteristics making it difficult to make satisfactory shapes.

A generally satisfactory product is that set forth in U.S. Pat. No. 5,190,899 in which a boron phosphate is utilized to increase the penetration resistance without any loss of hot strength or negative effects during processing to form the shape. Such product is a large improvement over the utilization of other materials such as the use of zinc borosilicate frit as set forth in U.S. Pat. No. 4,088,502 or the use of barium sulfate in the case of U.S. Pat. No. 4,126,474. As noted in U.S. Pat. No. 5,190,899 the addition of zinc borosilicate frit presents problems of severe sticking to the press used to form the brick and the use of barium sulfate lowers hot strengths.

With respect to the shapes set forth in U.S. Pat. No. 5,190,899, there remains an undesired degree of penetration and dross buildup during service.

SUMMARY OF THE INVENTION

The present invention overcomes the prior problems and results in high alumina refractory shapes with high resistance to aluminum penetration and buildup of dross and which have the desired hot strength and can be processed without adverse effects.

Briefly, the present invention comprises high alumina refractory mixes and shapes with high resistance to aluminum penetration made from a mix comprising at least about 60% by weight aluminum oxide, about 1% to 5% by weight boron phosphate, and about 5% to 15% by weight of silicon carbide, and for each 100 parts by weight of the mix a phosphorus binder in an amount sufficient to bind the mix.

The invention also comprises the method of minimizing aluminum penetration and dross buildup on a refractory employed for the containment of molten aluminum comprising forming the mix into a shape and heating the same at a temperature of at least about 600° F. and below the oxidation temperature of silicon carbide before employing the shape in contact with molten aluminum.

DETAILED DESCRIPTION

While the present invention is utilizable with any kind of a refractory shape, it will be discussed in connection with brick, particularly those utilized in aluminum furnaces.

As noted, the essential components of the mix used in forming the brick are at least about 60% by weight of aluminum oxide, about 1% to 5% by weight boron phosphate, 5% to 15% by weight of silicon carbide, and a phosphorus-containing binder to bind the mix.

As to the source of aluminum oxide used in forming the brick, it is preferred to utilize a bauxite, preferably a calcined bauxite, although additional aluminum oxide in the form of synthetic alumina can also be added to the composition. The aluminum oxide is the main ingredient of the brick, and, as noted, calcined bauxite can be used, preferably one which contains about 85% to 90% aluminum oxide. It is desired to use a combination of the bauxite, preferably in the coarse fractions, and an alumina, preferably a more pure alumina powder in the fines. This is most economical and a mixture of the two is preferably one which contains about 75 to 80 parts by weight of bauxite and 10 to 15 parts by weight of alumina.

As to the boron phosphate, any can be utilized although it is preferred that it have a particle size of about −65 mesh and finer, preferably −150 mesh.

With respect to the silicon carbide, it is employed, in an amount of 5 to 15 parts by weight in 20 the composition of the mix and it is preferably a silicon carbide having a mesh size of −200 mesh.

Other usual components that can be included in the brick for the usual effect are ball clays, kaolin clays and volatilized silica as plasticizers and these are added in proportions of about 5 parts by weight or less.

It is also required to utilize in the mix a phosphorus containing binder, one that can react with the alumina during curing at a temperature of about 500° to 600° F, as discussed below, in order to form a stable aluminum orthophosphate bond. A preferred binder is phosphoric acid although a monoaluminum phosphate solution can also be utilized. These phosphorus-containing materials act to bind the mix during formation of brick. It is preferred to use phosphoric acid and to add about 4% to 5% by weight $P_2O_5$ based on 100 parts by weight of the mix. Water alone is insufficient to form a desirable product.

As to proportions, the table below sets forth the range of operable proportions of the essential ingredients of the composition and the preferred amounts.

| TABLE OF PORTIONS | | |
|---|---|---|
| | Proportions (% by Wt.) | |
| Component | Operable | Preferred |
| Aluminum Oxide | 60-90 | 85-90 |
| Boron Phosphate | 1-5 | 2-3 |
| SiC | 5-15 | 9-11 |

The mesh size ranges of the mixes are adjusted to that most suitable for forming brick as is conventional in the brick-forming art. All mesh sizes noted herein are Tyler Standard mesh sizes.

While levels at about 5% and higher of the boron phosphate can be utilized it has been noted that the processing characteristics in forming the brick are adversely affected at these elevated levels and there can be difficulty in controlling the pressing process and sticking of the mix to the press pads.

In forming the brick, it is only necessary to mix the components and to press at the usual brick pressing pressures, namely around 8–12,000 psi, and then to heat the brick. The brick are not to be fired, but are to be heated at a temperature of at least about 600° F., preferably 940° F., which is needed to transform all the various intermediate soluble aluminum phosphate phases into an insoluble aluminum orthophosphate phase, to a temperature below the oxidation temperature of silicon carbide, below about 2300° F.

The invention will be further described in connection with the following examples, which are set forth for purposes of illustration only.

EXAMPLES 1 to 6

A series of 6 different bricks were made utilizing the mix formulations set forth in Table I below. Also set forth in Table I, are the details of the forming pressure, utilizing a conventional brick forming press to form the bricks, the resultant density, and the heating temperature of the bricks. The brick of Mixes 1 to 3 were cured at 600° F. and, for comparison purposes, Mixes 4 to 6 were heated at 2300° F.

TABLE I

| Mix Designation: | 1 | 2 | 3 | 4 | 5 | 6 |
|---|---|---|---|---|---|---|
| Mix: | | | | | | |
| Bauxite 5/10 mesh | | 26% | — | — | — | — |
| 10/38 | | 23 | — | — | — | — |
| −38 | | 15 | — | — | — | — |
| BMF | 18.5 | 13.5 | 8.5 | — | — | — |
| Bauxite 4.10 mesh | — | — | — | | 18.5 | |
| 10/28 | — | — | — | | 30 | |
| −28 | — | — | — | 18 | | 17 |
| BMF | — | — | — | 16 | 11 | 2 |
| SiC −200 mesh | — | 5 | 10 | — | 5 | 15 |
| Alumina | | | | 10 | | |
| Ball Clay | | | | 5 | | |
| Boron Phosphate | | | | 2.5 | | |
| Plus Additions: | | | | | | |
| Phosphoric Acid | | | | 7.5% | | |
| Forming Pressure, psi: | | | | 10,000 | | |
| Pressed Bulk Density, pcf: | 184 | 182 | 180 | 185 | 184 | 180 |
| | Cured at 600° F. | | | Burned at 2300° F. | | |
| % Linear Change during Curing: | −0.3 | −0.3 | −0.2 | — | — | — |
| Linear Change during Burning: | — | — | — | +0.2 | +1.3 | +0.9 |

The brick once formed, and cured at the lower temperatures or burned at higher temperatures can be utilized as a lining in a metallurgical vessel for handling molten aluminum, such as a furnace, and in that case they are simply placed in the vessel in the conventional manner to form a refractory lining on the interior of the furnace after being cured. The resulting lining is much more resistant to aluminum penetration and dross buildup and to the extent that there is buildup, it can be more easily removed utilizing the conventional means for removing the same.

After being formed, linear change in curing or during burning were noted and the brick were then further tested utilizing the conventional Reheat Test and the known 72 Hour Aluminum Cup Test, the latter being utilized to determine aluminum penetration and aluminum adherence. The results are set forth in Table II below.

TABLE II

| Mix Designation: | 1 | 2 | 3 | 4 | 5 | 6 |
|---|---|---|---|---|---|---|
| Mix Variables: | | | | | | |
| SiC Addition, %: | 0 | 5 | 10 | 0 | 5 | 15 |
| CalC. $Al_2O_3$ Content, % | 84.6 | 80.2 | 75.7 | 84.6 | 80.2 | 71.2 |
| Heat Treatment: | | 600° F. | | | 2300° F. | |
| Bulk Density, pcf (Av. 4): | 179 | 178 | 178 | 177 | 165 | 164 |
| Modulus of Rupture, psi | | | | | | |
| At Room Temperature: | 2450 | 2420 | 2520 | 3180 | 3210 | 1700 |
| At 2,000° F.: | 1740 | 2110 | 2610 | 3090 | 2660 | 1720 |
| Apparent Porosity, %: | 14.7 | 15.1 | 15.4 | 16.0 | 19.8 | 19.9 |
| Apparent Specific Gravity: | 3.37 | 3.35 | 3.32 | 3.36 | 3.31 | 3.27 |
| 2550° F. Reheat | | | | | | |
| % Linear Change: | 1.2 | 1.0 | 0.9 | 0.1 | 0.7 | 0.1 |
| % Volume Change: | 2.9 | 3.4 | 4.1 | 0.6 | 1.6 | −0.4 |
| 72 Hr. Aluminum Cup Test Using 7075 Aloy @ 1500° F. Depth of Aluminum Penetration and Reaction, in: | 0 to 1/32 | 0 to <1/32 | 0 | 0 | 0 | 0 |
| Aluminum Adherence: | Strong | Strong | Moderate | Moderate | Weak | Weak |

Table III shows the screen analysis of the various mixes, all mesh sizes herein being Tyler standard mesh sizes.

TABLE III

| Mix Designation: | 1 | 2 | 3 | 4 | 5 | 6 |
|---|---|---|---|---|---|---|
| Screen Analysis | | | | | | |
| % Held on 3 mesh | | | | | | |
| 4 | | | | 2 | 2 | 1 |
| 6 | | | | | | |
| 8 | | | | | | |
| 10 | 14 | 16 | 15 | 12 | 12 | 12 |
| 14 | | | | | | |
| 28 | 28 | 29 | 29 | 26 | 24 | 26 |
| 35 | | | | | | |
| 48 | | | | | | |
| 65 | 12 | 10 | 11 | 14 | 14 | 13 |
| 100 | | | | | | |
| 150 | 8 | 6 | | 8 | 8 | 5 |
| 200 | | | 15 | | | |
| 270 | | | | | | |
| 325 | 10 | 9 | | 8 | 8 | 12 |
| Pass 325 mesh | 28 | 30 | 30 | 30 | 32 | 31 |

These results show that while all of the mixes were tempered with the same amount of phosphoric acid, and while some of the brick containing the silicon carbide were cured and others were fired or burned, it is the cured brick containing the silicon carbide that have the necessary physical properties as well as the properties desired with respect to resistance to adhesion of aluminum and buildup. It will be noted that the modulus of rupture at both room temperature and 2000° F. was equivalent or higher for the mixes containing a silicon carbide with the mix containing 10% by weight silicon carbide being most suitable. The results of the 72 Hour Cup Test, showed a decrease in metal penetration and adherence with the addition of silicon carbide.

It should also be noted that while some of the physical properties of the burned brick containing the silicon carbide (Mixes 5 and 6) were inferior to the burned brick without the silicon carbide (Mix 4), these burned brick had less aluminum adherence than the mixes which were only cured. The density was decreased and porosity increased for the mixes containing silicon carbide and the modulus of rupture at room temperature was significantly decreased in the mix containing 15% silicon carbide. In spite of the overall decrease in physical properties in the mixes containing silicon carbide, these mixes had improved resistance to aluminum attack. Because a decrease in the desirable physical properties occurred after burning at 2300° F., it is apparent that this composition, if burned, should be heated to temperatures less than 2300° F.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A mix for forming a high alumina refractory shape with high resistance to aluminum penetration consisting essentially of at least about 60% by weight aluminum oxide, about 1 to 5% by weight boron phosphate, and about 5 to 15% by weight silicon carbide, and for each 100 parts by weight of the mix, a phosphorous-containing binder in an amount sufficient to bind the mix.

2. The mix of claim 1 wherein said binder is phosphoric acid or a monoaluminum phosphate solution.

3. The mix of claim 2 wherein said aluminum oxide is in the form of bauxite, alumina, or a mixture thereof.

4. A high alumina refractory shape with high resistance to aluminum penetration comprising about 60% by weight aluminum oxide, about 1 to 5% by weight boron phosphate, and about 5 to 15% by weight silicon carbide, said shape being bonded by aluminum phosphate.

5. The shape of claim 4 wherein said aluminum oxide is in the form of bauxite, alumina, or a mixture thereof.

6. The shape of claim 4 in the form of a brick.

7. The shape of claim 5 in the form of a brick.

8. A method of minimizing aluminum penetration and dross buildup on a refractory employed for the containment of molten aluminum, comprising forming the mix of claim 1 into a refractory shape, heating said shape at a temperature of at least 600° F. but below the oxidation temperature of silicon carbide, and then utilizing said refractory shape for the containment.

9. The method of claim 8 wherein said mix is formed into the form of a brick.

10. The method of claim 9 wherein the mix used consists essentially of at least about 60% by weight aluminum oxide, about 1 to 5% by weight boron phosphate, and about 5 to 15% by weight silicon carbide, and for each 100 parts by weight of the mix, phosphoric acid or a monoaluminum phosphate in an amount sufficient to bind the mix.

11. The method of claim 9 wherein the mix used consists essentially of at least about 60% by weight of bauxite, alumina, or a mixture thereof, about 1% to 5% by weight boron phosphate, and about 5 to 15% by weight silicon carbide, and for each 100 parts by weight of the mix, phosphoric acid or a monoaluminum phosphate in an amount sufficient to bind the mix.

* * * * *